June 10, 1941. D. OATMAN 2,245,411
AUTOMOBILE BEACH CURTAIN
Filed May 14, 1940 2 Sheets-Sheet 1
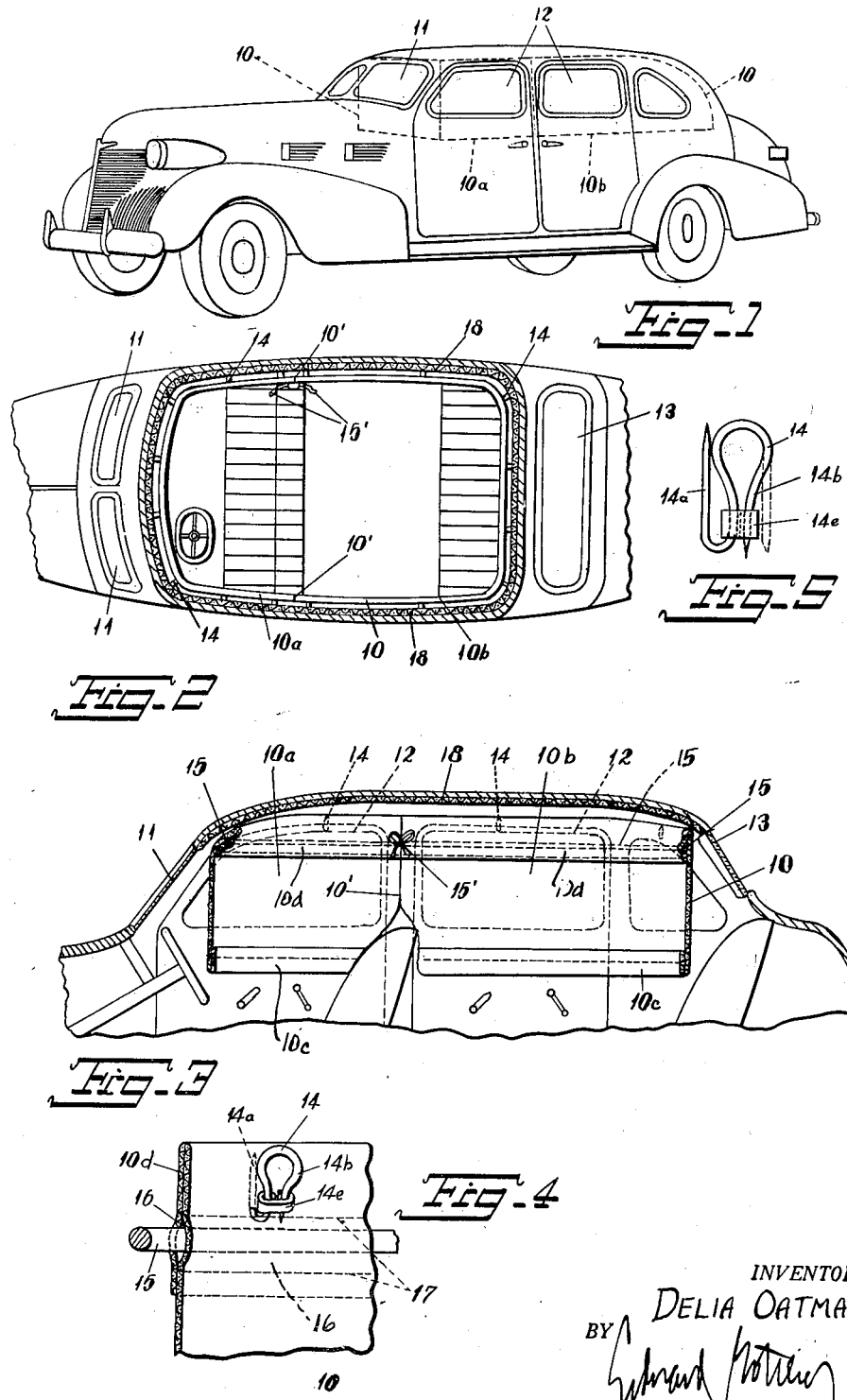
INVENTOR.
DELIA OATMAN
BY
ATTORNEY June 10, 1941. D. OATMAN 2,245,411
AUTOMOBILE BEACH CURTAIN
Filed May 14, 1940 2 Sheets-Sheet 2
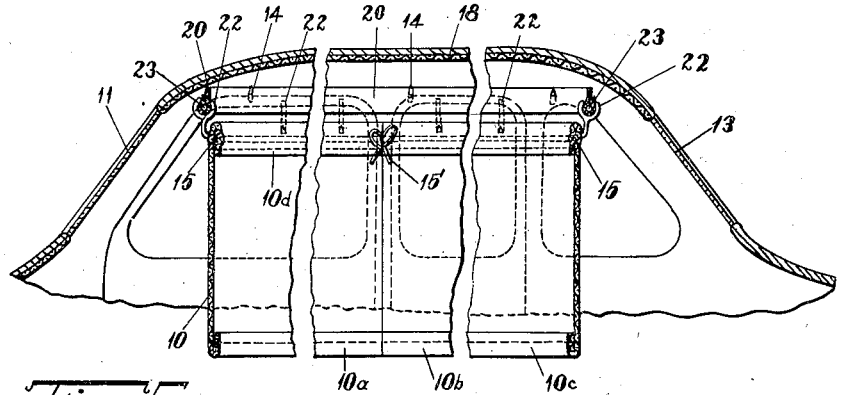
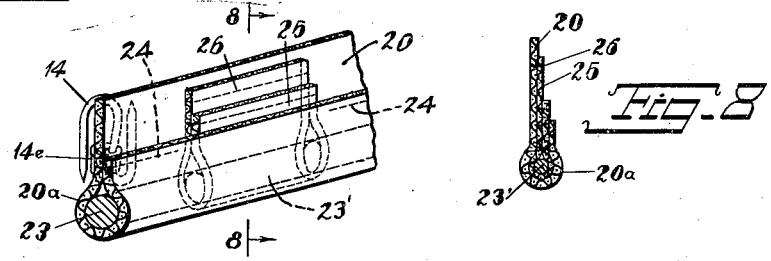
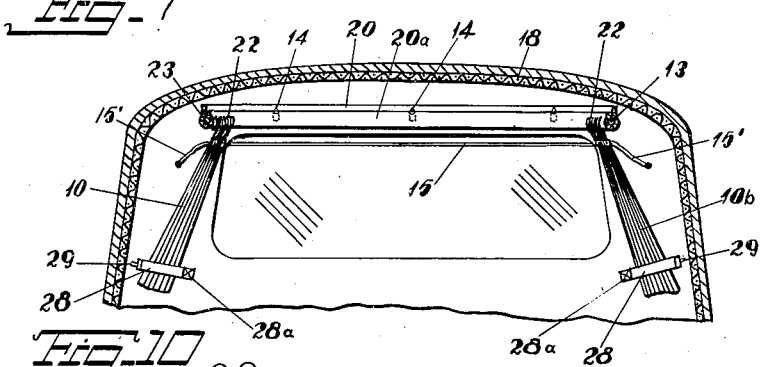
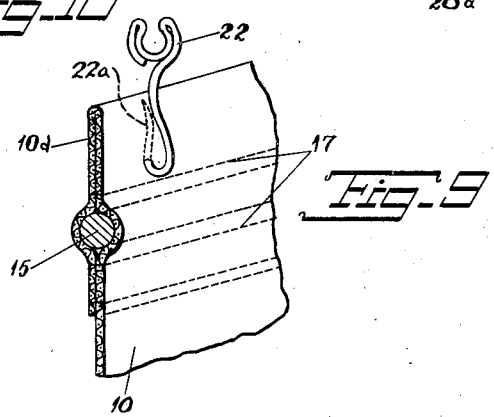
INVENTOR.
DELIA OATMAN
BY
ATTORNEY.

Patented June 10, 1941

2,245,411

UNITED STATES PATENT OFFICE 2,245,411

AUTOMOBILE BEACH CURTAIN

Delia Oatman, Staten Island, N. Y.

Application May 14, 1940, Serial No. 335,067

8 Claims. (Cl. 156—10)

This invention relates to new and useful improvements in an auto beach curtain.

The invention proposes an auto beach curtain which is characterized by a curtain body made of cloth, or other suitable material, and adapted to extend across the windshield, the side windows and the rear window of an automobile. It is proposed to associate means with said curtain body for removably supporting the same, as specified, within the automobile.

The auto beach curtain, in accordance with this invention, has numerous advantages. It may be used by the many people who cannot obtain lockers at bath houses for various reasons—either for a lack of sufficient lockers or for a lack of funds. It may be used by people who do not wish to mingle with others in crowded bath houses. The danger of contracting diseases, such as athlete's foot, etc., will be greatly reduced. It will make unnecessary the practice of some people, who are either unable or unwilling for various reasons to secure lockers at the beach, of donning bathing suits at home and then riding through crowded thoroughfares to the beach attired in bathing suits, bathrobes, or other scanty attire; or of putting up of towels, papers, blankets, etc., on the inside of automobiles for the purpose of providing privacy for donning bathing suits, or redressing. Such practices not only detract from the appearance of the automobile and of the beach, but frequently do not provide the privacy desired.

Furthermore, the beach curtain may be used by tourists for the purpose of providing additional dressing room space when staying overnight in tents, cabin camps, etc.

It is proposed to so construct the auto beach curtain that it may be designed for use in any model of any make of automobile, or several designs may be used for several groups of models or makes.

Still further the invention contemplates constructing the curtain of a plurality of separate sections, and furthermore these sections may be arranged in a manner so that the curtain may be opened at the sides in the vicinity of the doors of the automobile to facilitate exit and entrance of persons without requiring the removal of the curtain or sections thereof.

Still further the invention contemplates a novel arrangement by which the curtain body is attached to the upholstery or other part or parts of the automobile, and firmly and securely held in position.

Another object of the invention resides in a construction wherein the auto beach curtain may be readily removed, or drawn to one or more inconspicuous points.

Still further the invention contemplates constructing the auto beach curtain of uniform height along its length, or of different heights to better accommodate the design of any particular make of automobile.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a perspective view of an automobile equipped with an auto beach curtain constructed in accordance with one form of this invention.

Fig. 2 is a horizontal sectional view taken directly below the roof of the automobile shown in Fig. 1.

Fig. 3 is a fragmentary longitudinal vertical sectional view of the automobile shown in Fig. 1.

Fig. 4 is a fragmentary perspective view of one area of the auto beach curtain.

Fig. 5 is a perspective view of one of the pins for mounting the curtain shown in the prior figures upon the upholstery of an automobile.

Fig. 6 is a fragmentary longitudinal vertical sectional view of an automobile equipped with an auto beach curtain constructed in accordance with another form of this invention.

Fig. 7 is a fragmentary perspective view of a portion of a flexible strip of material used in Fig. 6.

Fig. 8 is a vertical sectional view taken on the line 8—8 of Fig. 7.

Fig. 9 is a fragmentary vertical sectional perspective view of a portion of the curtain body shown in Fig. 6.

Fig. 10 is a transverse view of Fig. 6 looking towards the rear window, but illustrated with the curtain collected at certain inconspicuous points of the automobile.

The auto beach curtain, in accordance with the form of the invention shown in Figs. 1 to 5, includes a curtain body 10 for extending across the windshield 11, side windows 12, and rear window 13 of an automobile. Means is associated with the curtain body 10 for removably supporting it as specified within the automobile. This means includes a plurality of fastening elements 14 which may be of any design or construction and extended along the top edge portion or other portions of the curtain body 10, and cooperative with the upholstery or other parts of the automobile.

The curtain body 10 preferably is made from cloth material, or other opaque sheet material suitable for the purpose intended. The curtain body 10 may be made from a plurality of separate sections. As illustrated on the drawings it is composed of two sections, indicated by reference characters 10a and 10b, respectively. These sections are so arranged that the ends 10' are disposed in the vicinity of the outer edges of the side doors of the automobile. With this arrangement it is possible to brush the ends 10' apart when a person leaves or enters the automobile. While two sections have been illustrated it should be borne in mind that it may comprise any number of sections. The bottom edge of the curtain body 10 is finished with a hemmed portion 10c.

The top edge portion of the curtain body 10 is formed with a relatively wide hem 10d. A cord or rope 15 is threaded through a passage 16 formed in the hem 10d or mounted thereon in other known ways. This passage 16 is formed by a pair of spaced parallel lines of stitches 17 sewn through the hem 10d. The cord 15 extends completely along the length of the entire curtain body 10, through the various sections thereof, and has its ends 15' adjacent one side of the automobile. These ends 15' are adapted to be tied together for the purpose of more securely mounting the curtain in position and for the purpose of allowing the sections of the curtain to be slipped along the cord when desired, as hereinafter more fully explained.

The means for removably supporting the curtain body 10 comprises a plurality of fastening elements 14, and as illustrated on the drawings by way of illustration, in the form of double pins. Each double pin 14 has an upwardly directed pointed end section 14a which is engaged into the material of the hem 10d or other portion. Each double pin 14 has a downwardly directed hook pointed end section 14b which is adapted to be engaged into the material of the upholstery 18 or other part of the automobile, and engageable with a clasp 14c mounted on the pin 14 by which the end section 14b may be held closed. This upholstery 18 comprises the cloth material extended across the ceiling and the top portions of the side walls of the automobile. The fastening elements 14 are arranged above the cord 15.

Figs. 1 and 2 illustrate the auto beach curtain as it would appear when being used. The windows of the car are covered over and the interior is completely private. While the car is parked at the beach, or other place, the beach curtain 10 is permitted to remain in position. The doors of the car may be opened, the curtain pushed aside, and persons enter or leave, as desired. Before the car is driven away it is necessary that the curtain 10 be removed. First the ends 15' of the cord are untied to generally loosen the curtain 10, and the sections 14b of the pins 14 are opened. Then the curtain 10 is pulled upwards at the points provided with the fastening elements 14 so that the fastening elements 14 are drawn out of the upholstery 18 of the automobile. In this way, or other obvious way, the curtain 10 is removed.

In Figs. 6-10 inclusive, a modified form of the invention has been disclosed which distinguishes from the prior form in the fact that the auto beach curtain is adapted to permanently remain in the automobile. However, it is so arranged that it may be drawn across the windshield, the side windows, and the rear window of the automobile when in use, and may be moved to an inconspicuous inoperative position in the automobile when not in use. According to this form of the invention the auto beach curtain includes a strip of flexible material 20 for extending inside of an automobile around the roof or the side walls and along the windshield, the side windows and the rear window.

Means is provided for supporting the strip 20 as specified within the automobile. This means includes a plurality of fastening elements 14 along the top edge portions of the strip 20 at spaced points and adapted to cooperate with the upholstery 18 of the automobile. These fastening elements 14 comprise the double pointed pins described in the previous form of the invention, or other fastening elements or means. It is intended that the strip 20 be mounted in position in the automobile and then allowed to permanently remain there. But it may be easily removed, if desired.

A curtain body 10 for extending across the windshield, the side windows and the rear window of the automobile is associated with the strip 20 in a particular manner. More specifically, means is provided for slidably mounting the curtain body 10 on said strip 20 so that it may be extended or collected at certain points, as desired. This means includes jaw shaped elements 22 of stiff or slightly flexible material, mounted at spaced points along the top portion of the curtain body 10. Each jaw shaped element 22 has a bottom hook shaped stem portion 22a or other portion adapted to be engaged into or connected with the material of the hem 10d of the curtain body. The strip 20 has a beaded bottom edge formed by a cord 23 mounted in the hem portion 20a thereof. At one point the beaded portion is removable so that the jaw shaped elements 22 may be engaged upon the other portions of the beaded formation.

Specifically, the hem 20a is secured closed by lines of stitches 24 which stop at the sides of the point of the area in question. At this area there is a narrow flexible strip 25 which is secured by a line of stitches 26 to the top portion of the strip 20. This strip of material 25 is provided with a short length of cord material 23'. The bottom portion of the strip 25 normally is disposed within the hem 20a, as illustrated in Fig. 7, and then the beaded area of the strip 20 is complete. However, the strip 25 may be pulled upwards out from the hem 20a and then the area of the hem 20a at this point has no filling, and consequently no longer is beaded. The jaws of the elements 22 may be slipped upwards over the thinned area of the hem 20a and then moved laterally to engage the beaded portions. After all the jaw shaped elements 22 are engaged on the beaded bottom edge of the strip 20, the strip 25 is placed back into position as shown in Fig. 7.

In Fig. 6 the auto beach curtain is shown as it would appear when being used. When it is no longer required it may be moved to inconspicuous points, as illustrated in Fig. 10. First the ends 15' of the cord 15 are untied to loosen the upper edge portion of the curtain body 10. Then one section 10a of the curtain body 10 is accumulated at the back corner of the body of the automobile by slipping the jaw shaped elements 22 along the beaded bottom edge of the strip 20. Then the other section 10b of the curtain body is accumulated at the other back corner of the automobile. Straps 28 are permanently attached at one of their ends 28a to the upholstery 18 of the automobile at the back, and are adapted to extend over the accumulated curtain body sections 10a and 10b and are cooperative with complementary fastening elements 29 on the upholstery 18 so as to hold the curtain body sections 10a and 10b stationarily in position.

The automobile may now be driven away. Attention is called to the fact that the strip 20 remains extended along the roof or sides of the automobile. To use the beach curtain it is a simple operation to extend it back to the position illustrated in Fig. 6.

The ends 15' of the cord 15 are pulled taut and tied together for the purpose of more securely holding the curtain body 10 in position and to provide means by which the end portions of the curtain may be slid back from the doorway.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters patent is:

1. An auto beach curtain, comprising a curtain body of opaque material for extending inside of an automobile around the roof and for removable support along the windshield, the side windows and the rear window of an automobile, said curtain body having a top edge portion, and means adjacently beneath said top edge portion for pulling the top area of the curtain body tight.

2. An auto beach curtain, comprising a curtain body of opaque material for extending inside of an automobile around the roof and for removable support along the windshield, the side windows and the rear window of an automobile, said curtain body having a top edge portion, and means adjacently beneath said top edge portion for pulling the top area of the curtain body tight, said curtain body being open at the sides in the vicinity of the doors of said automobile, and said means comprising a cord within a hem extending along said curtain body, said cord having its ends tied.

3. An auto beach curtain, comprising a curtain body of opaque material for extending inside of an automobile around the roof and for removable support along the windshield, the side windows and the rear window of an automobile, said curtain body being formed with a top hem into which fastening elements engage to support the curtain body, and a cord slidably engaged through said top hem and having its ends tied together for pulling the top area of the curtain body tight.

4. For supporting an auto beach curtain, a strip of flexible material for extending inside of an automobile around the roof and for support along the windshield, the side windows and the rear window, a curtain body of opaque material for extending across the windshield, the side windows and the rear window of said automobile, and means for slidably mounting said curtain body on said strip so that it may be extended or collected at certain points in said automobile.

5. In a device of the class described, a strip of flexible material for extending inside of an automobile around the roof and for support along the windshield, the side windows and the rear window, and means for slidably mounting a curtain body on said strip so that it may be extended or collected at certain points in said automobile, comprising a beaded area formed along the bottom edge of said strip of material, and jaw shaped elements for being mounted on the top of the curtain body at spaced positions and slidably engaging said beaded area.

6. In a device of the class described, a strip of flexible material for extending inside of an automobile around the roof and for support along the windshield, the side windows and the rear window, and means for slidably mounting a curtain body on said strip so that it may be extended or collected at certain points in said automobile, comprising a beaded area formed along the bottom edge of said strip of material, and jaw shaped elements for being mounted on the top of the curtain body at spaced positions and slidably engaging said beaded area, said beaded area having a removable section to expose end portions of the beaded area from which said jaw shaped elements may be removed or replaced on said strip.

7. In a device of the class described, a strip of flexible material for extending inside of an automobile around the roof and for support along the windshield, the side windows and the rear window, and means for slidably mounting a curtain body on said strip so that it may be extended or collected at certain points in said automobile, comprising a beaded area formed along the bottom edge of said strip of material, and jaw shaped elements for being mounted on the top of the curtain body at spaced positions and slidably engaging said beaded area, said beaded area having a removable section to expose end portions of the beaded area from which said jaw shaped elements may be removed or replaced on said strip, said curtain body having a top hem, and a cord engaged through said top hem and adapted to have its ends tied together for holding the top of the curtain body taut.

8. In a device of the class described, a strip of flexible material for extending inside of an automobile around the roof and for support along the windshield, the side windows and the rear window, and means for slidably mounting a curtain body on a strip so that it may be extended or collected at certain points in said automobile, comprising a beaded area formed along the bottom edge of said strip of material, and jaw shaped elements for being mounted on the top of the curtain body at spaced positions and slidably engaging said beaded area, said beaded area having a removable section to expose end portions of the beaded area from which said jaw shaped elements may be removed or replaced on said strip, said curtain body having a top hem, and a cord engaged through said top hem and adapted to have its ends tied together for holding the top of the curtain body taut, and means for securely holding said curtain body sections at the said collected points.

DELIA OATMAN.